United States Patent
Stahl (10) Patent No.: US 8,565,077 B2
(45) Date of Patent: Oct. 22, 2013

(54) SYSTEM AND METHOD FOR ENHANCING NETWORK QUALITY OF SERVICE

(75) Inventor: Thomas Anthony Stahl, Indianapolis, IN (US)

(73) Assignee: Thomson Licensing

( * ) Notice: Subject to any disclaimer, the term of this patent is extended or adjusted under 35 U.S.C. 154(b) by 459 days.

(21) Appl. No.: 11/587,422

(22) PCT Filed: Apr. 27, 2005

(86) PCT No.: PCT/US2005/014567
§ 371 (c)(1),
(2), (4) Date: Oct. 24, 2006

(87) PCT Pub. No.: WO2005/107192
PCT Pub. Date: Nov. 10, 2005

(65) Prior Publication Data
US 2007/0223470 A1    Sep. 27, 2007

Related U.S. Application Data

(60) Provisional application No. 60/566,153, filed on Apr. 28, 2004.

(51) Int. Cl.
*H04B 7/216* (2006.01)

(52) U.S. Cl.
USPC .................................................. 370/230

(58) Field of Classification Search
USPC ............ 370/389, 395.21, 252, 338, 229, 230, 370/235
See application file for complete search history.

(56) References Cited

U.S. PATENT DOCUMENTS

| | | | | |
|---|---|---|---|---|
| 6,173,332 B1* | 1/2001 | Hickman | ....................... | 709/235 |
| 6,393,483 B1* | 5/2002 | Latif et al. | ..................... | 709/226 |
| 7,072,295 B1* | 7/2006 | Benson et al. | ................ | 370/230 |
| 7,174,371 B2 | 2/2007 | Elo et al. | | |
| 2002/0071398 A1* | 6/2002 | Moran et al. | .................. | 370/252 |
| 2003/0123391 A1* | 7/2003 | Chen et al. | ................. | 370/230.1 |
| 2004/0073600 A1 | 4/2004 | Elo et al. | | |

(Continued)

FOREIGN PATENT DOCUMENTS

CN        1459955 A       12/2003
EP        1 134 941 A1    9/2001

(Continued)

OTHER PUBLICATIONS

European Search Report, Oct. 10, 2005.

(Continued)

*Primary Examiner* — Dang Ton
*Assistant Examiner* — Kevin Lee
(74) *Attorney, Agent, or Firm* — Robert D. Shedd; Paul P. Kiel (57) ABSTRACT

A data transfer network infrastructure device having a plurality of ingress ports for accepting data from a domain of a data network; and, a user interface for enabling a user to limit a rate at which data is accepted from the data network on at least one of the ingress ports, wherein the data transfer rate between the at least one of the ingress ports and a device coupled to the at least one of the ports is limited, whereby a bandwidth limit is implemented by the limit at which the data is accepted into the ingress port.

20 Claims, 9 Drawing Sheets

(56) References Cited

U.S. PATENT DOCUMENTS

| | | | |
|---|---|---|---|
| 2004/0085959 A1* | 5/2004 | Ohkawa | 370/389 |
| 2004/0095914 A1* | 5/2004 | Katsube et al. | 370/338 |
| 2004/0213221 A1* | 10/2004 | Civanlar et al. | 370/389 |
| 2006/0262750 A1* | 11/2006 | Walton et al. | 370/329 |

FOREIGN PATENT DOCUMENTS

| | | |
|---|---|---|
| GB | 2 336 076 A | 10/1999 |
| JP | 2000-151743 | 5/2000 |
| JP | 2002-135287 | 5/2002 |

OTHER PUBLICATIONS

Tagami, et al., "A Study of Improving TCP Connectivity using Priority Queue", of Technical Report of IEICE (IN2001-187, vol. 101, No. 716, pp. 53-60) published by The Institute of Electronics, Information and Communication Engineers (IEICE) on Mar. 7, 2002.

Isobe, "Latest Ethernet Technique, IEEE802.1p and IEEE802.1Q Achieving Priority Control", of Nikkei Communication (No. 2001.11.5, vol. 353, pp. 168-169) published by Nikkei BP on Nov. 5, 2001.

* cited by examiner

SYSTEM AND METHOD FOR ENHANCING NETWORK QUALITY OF SERVICE

This application claims the benefit, under 35 U.S.C. §365 of International Application PCT/US2005/014567, filed Apr. 27, 2005 which was published in accordance with PCT Article 21(2) on Nov. 20, 2005 in English and which claims the benefit of U.S. provisional patent application No. 60/566,153 filed Apr. 28, 2004.

TECHNICAL FIELD

The present invention relates generally to data transmission networks, and more particularly to Quality of Service (QoS) of data transmission networks.

BACKGROUND OF THE INVENTION

Data transmission networks are widely used in multimedia communications systems. "Data transmission network", as used herein, generally refers to a group of two or more data operative devices linked together via a communications medium, such as wired (e.g., Ethernet) or wireless (e.g., 802.11x compliant) communications links. Non-limiting examples of data transmission networks include wired and wireless Local Area Networks (LANs) and Wide Area Networks (WANs). "Data operative device", as used herein, generally refers to a device that receives and/or provides data to/from a data transmission network, such as a personal computing device or digital television, for example.

Ethernet, one of the most widely implemented LAN standards, has become a popular technology for residential data transmission networks. A primary motivator for installing a wired Ethernet may be for sharing a broadband connection with multiple PCs in a household. The broadband connection may typically be a Cable or DSL modem that provides domain interconnectivity with the global interconnection of computers and computer networks commonly referred to as the Internet. Ethernet is often the technology of choice since many commercially available personal computers (PCs), cable modems and DSL modems already support networking over Ethernet.

Applications that take advantage of existing Ethernet infrastructures are emerging. One such application is the distribution of media data such as voice, video and music. There are many potential applications for sending digital video across a home network. Applications include video distribution from a satellite set-top box, music distribution from the "MyMusic" directory on a personal computer (PC) (e.g., AudioTron), and sharing video among networked personal video recorders (PVRs) (e.g., ReplayTV), for example. Such applications may further include non-real-time data transfer applications and streaming applications.

"Streaming", as used herein, generally refers to a technique for transferring data such that it can be processed as a substantially steady and continuous stream. A streaming data consumer (e.g. a client) typically starts playing (displaying) streamed content before the entire file has been received. This advantageously provides for less delay before content playback proceeds as compared to downloading an entire file ahead-of-time, for example. However, for streaming to work properly, the client must regularly collect and process data quickly enough for smooth playback. This means that if the streaming client receives the data more quickly than required, it needs to buffer excess data. However, if the data doesn't come quickly enough, playback will not be smooth. To avoid such problems, media is typically transported across residential or home networks as files (as fast as possible) using one or more large buffers to store portions of the media until it is ready to be received. While this may be acceptable for pre-recorded media, certain applications, e.g., video surveillance, IP Telephony and "live" content, generate and consume data substantially in real-time. Large buffers can add an intolerable amount of delay for such real-time applications.

An Ethernet connection with 100 Mbps full duplex links and non-blocking switches typically has a large amount of bandwidth (BW) available for transporting a digital audio/video (AV) stream. For such a network, it is unlikely that packet errors will occur, and unless the network is overloaded it is unlikely that packets will get lost. Both of those effects are more likely when at least part of the network is wireless in form. However, in either case, it is quite possible that packets will arrive late. A principal mechanism that may cause packets that are traversing a typical residential Ethernet network to arrive late (or be dropped in the case of a wireless network) would be other data traffic.

Ethernet was originally designed for a common physical medium. Access to the physical medium is controlled by a Carrier Sense Multiple Access-Collision Detection algorithm (CSMA-CD). Access to the medium is not guaranteed. The algorithm focuses on fairness and best effort. Streaming data, by nature, needs to be transported quickly. However, a file transfer application with substantial amounts of data may essentially insist on trying to transport it as fast as possible. In such a case, the file transfer application may consume most of the available bandwidth (BW), thus causing some of the streaming packets to get onto the network late.

Figure 1A:
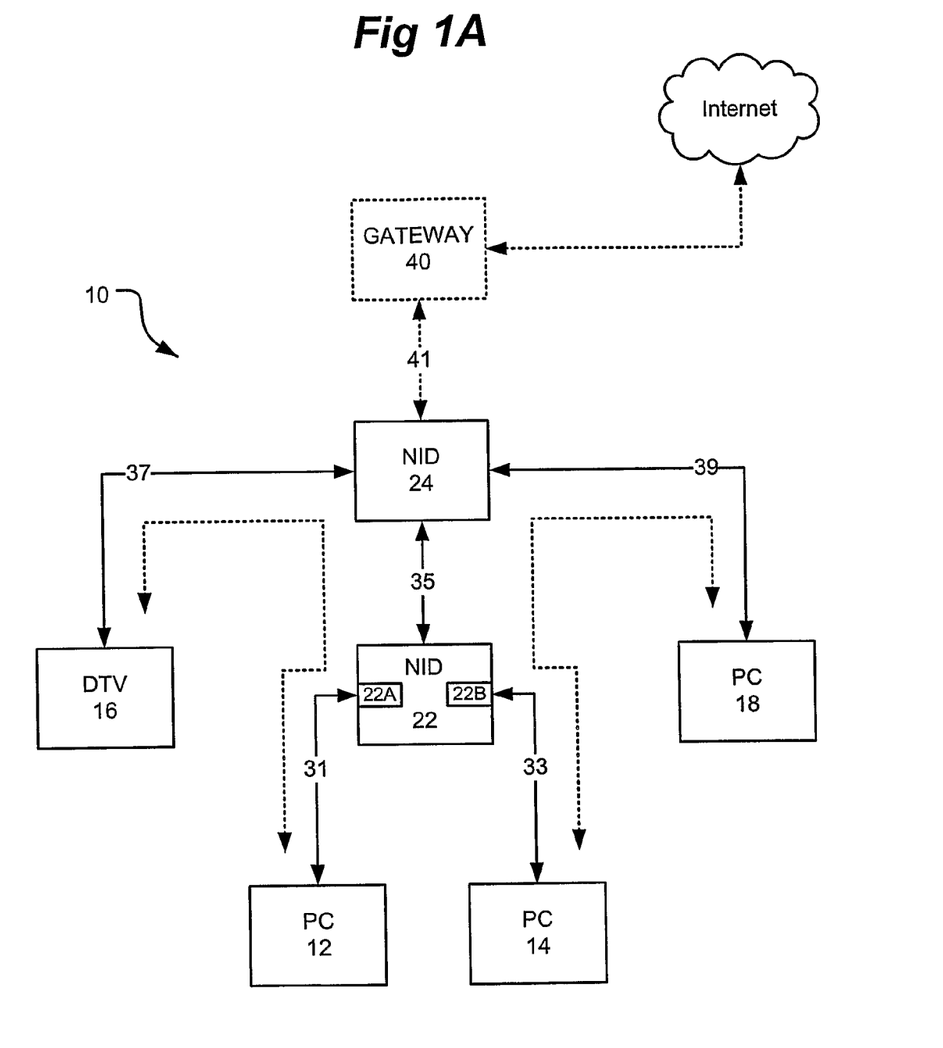
FIGS. 1A and 1B illustrate exemplary data transmission network architectures suitable for use with the present invention.

Ethernet implementations may typically not use a single collision domain (i.e., use switches with buffers instead of a common wired media or Ethernet Hub). However, excess uncontrolled traffic is still a problem. FIG. 1A shows a typical home network arrangement 10. Packets are distributed from a source to a destination through a hierarchy of network infrastructure devices (NIDs) 22, 24. Exemplary network infrastructure devices include Ethernet switches, routers and hubs, wireless adapters, access points (APs), and bridges. Devices 12, 14, 16, 18 operate as either source or destination devices. Such devices may take the form of computing devices like personal computers (PCs) and/or other networkable devices, such as digital televisions (DTVs) and playback devices, for example. NID 24 may be operatively coupled to a gateway 40 that provides connectivity between network 10 and the global interconnection of computers and computer networks commonly referred to as the Internet. The gateway may typically route data traffic between device 12, 14, 16, 18 and the Internet via NID 24. Network 10 may take the form of a residential network, for example.

In a typical scenario a user desires to stream video from device 12 (that may take the form of a PC, for example) to device 16 (that may take the form of a digital television (DTV), for example) at a data rate of around 10 Mbps. Connection links 31, 35 and 37 operate to couple the source and destination devices via NIDs 22, 24, and may take the form of wired 100 Mbps Ethernet links. Where the amount of other traffic on the network is relatively low, such an application may perform reasonably well. However, in the case where a second user also desires to perform certain tasks that require network processing, such as transferring a relatively large data file (e.g. digital movie) from device 14 (that may take the form of a PC, for example) to device 18 (that may take the form of another PC, for example) connected via connection links 33, 35 and 39 (e.g. 100 Mbps Ethernet link), problems may arise. Since that transfer is a simple file transfer, a common implementation is for that file to be transferred as fast as the network and participating processors permit. Accordingly, device 14 may typically always have a packet available to send such that as soon as Ethernet Link 33 is available, the packet will be transferred. This will continue until the receive buffer in NID 22 is full or the file transfer is complete. If the buffer fills up, NID 22 may exercise some sort of flow control or may simply drop the packet. Once the buffer in NID 22 has room for more packets, packet transfer will resume. As can be seen from FIG. 1A, link 35 is carrying both sets of traffic. Where that link becomes saturated (i.e., the link transfers packets at its maximum capacity), both streaming and file transfer applications will experience problems such as packet delay with jitter. Although the delay and jitter may not be critical to the file transfer application, it may have deleterious effects on the streaming application as previously described. Accordingly, the rapid transport of large media files across the network may cause streaming applications to function poorly or improperly. Examples of rapid file transport may include sending a file from a PC to a printer and media distribution applications.

Wireless communications links exacerbate this problem. The total bandwidth (BW) available may be on the order of 54 Mbps. After accounting for media contention and headers, the actual throughput may be around about 30 Mbps. This BW is shared among all wireless devices on that sub-network, such that a single collision domain exists. As more packets attempt access onto the wireless channel, more collisions result. This in turn reduces the amount of available BW for all of the applications. Thus, the effect on wireless networks may be even more severe than that described above for a wired network. Alternative systems and methods for ensuring QoS in such conditions are desired.

BRIEF SUMMARY OF THE INVENTION

A data transfer network infrastructure device including: a plurality of ports for accepting data from a domain of a data transfer network; and, a user interface for enabling a user to limit a rate at which data is accepted from the data transfer network on at least one of the ports, wherein the data transfer rate between the at least one of the ports and a device coupled to the at least one of the ports is limited, whereby the risk of delay of other data traversing the data transmission network is reduced.

BRIEF DESCRIPTION OF THE DRAWINGS

Understanding of the present invention will be facilitated by consideration of the following detailed description of the preferred embodiments taken in conjunction with the accompanying drawings, wherein like numerals refer to like parts and.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for purposes of clarity, many other elements found in typical network systems and methods of making and using the same. Those of ordinary skill in the art will recognize that other elements are desirable and/or required in order to implement the present invention. However, because such elements are well known in the art, and because they do not facilitate a better understanding of the present invention, a detailed discussion of such elements is not provided herein.

According to an aspect of the present invention, a user configurable functionality may be added to network infrastructure devices (NIDs), such as Ethernet switches, routers and hubs, wireless adapters, access points (APs), and bridges, to improve quality of service (QoS) for applications such as data streaming applications (e.g., video streaming). The functionality may serve to selectively limit available bandwidth (BW), e.g., bit rate, at ingress ports of such a device. The BW may be limited to a value that may be chosen by a user, or may be pre-configured, for example. In this way, data transmitting devices (e.g., personal computers and Internet Appliances) coupled to such a port will not flood the network with packets (e.g., as in printing a file), which may otherwise result in reducing available BW from streaming applications on the network. This methodology can be used with intra-domain network infrastructure devices, such as Ethernet switches, routers and hubs, wireless adapters, access points (APs), and bridges, to keep devices from saturating the links, thereby improving BW availability for streaming applications.

According to an aspect of the present invention, one or more infrastructure components of a heterogeneous IEEE802 compliant network are operative to provide selected bandwidth usage constraints, resulting in better QoS for streaming applications. According to another aspect, implementation does not typically require changes to applicable standards or to endpoints. Implementation can optionally be integrated with other QoS schemes such as those based on packet priorities, for example. Thus, an intra-domain network infrastructure component according to the present invention enables a more well-behaved data transfer network that allows for improved streaming data performance in the presence of other network traffic.

According to an aspect of the present invention, one or more intra-domain network infrastructure components of an IEEE802 based home network that afford improved QoS for streaming applications may be provided. As previously discussed, problems for streaming applications on a residential or home network are often caused by traffic generated by other nodes on the network such traffic results in at least some of the links in the network to become overloaded, causing delay in the transmission of streaming data packets. Moreover, residential data transfer networks are typically not over-provisioned. Thus, extra traffic entering a collision domain not only overloads the common media used to transfer packets but can also cause additional collisions and subsequent backoff intervals, thereby reducing the available BW for all network applications.

Referring again to FIG. 1A, and in accordance with an aspect of the present invention, the maximum packet transfer rate of applications running on devices 12, 14, 16 and 18 may be limited, to lessen the likelihood of one application using an excessive amount of network available bandwidth. The packet data traffic transmitted from an endpoint application running on a device 12, 14, 16, 18 traverses a communication link 31, 33, 35, 37, 39 to a NID 22, 24. Control over applications running on devices 12, 14, 16, 18 may be asserted at one or more of the NIDS 22, 24.

The present invention is largely discussed as it relates to Ethernet routers, hubs and switches. "Switch", as used herein, generally refers to a device that forwards packets between data transmission network segments. By way of example, switches typically operate at the data link layer (layer 2) or network layer (layer 3) of the OSI Reference Model. "Domain", as used herein, refers to a group of computers and devices on a data transfer network that are administered generally as a unit. For example, such devices often share common rules, procedures and/or a common IP address portion.

Since it may prove difficult to control the output rate of the endpoint applications running on devices 12, 14, 16, 18, according to an aspect of the present invention the inputs to one or more of switches 22, 24 (e.g., ingress ports 22A, 22B of NID 22) may be bandwidth limited (i.e., bit rate limited). For simplicity and because many networks including residential networks are custom installations, the bandwidth limiting functionality may be user programmable or selectable. According to an aspect of the present invention, a user may be presented with the option to set or limit the maximum BW on certain network ports in given increments, such as 1 or 5 Mbps.

Figure 1B:
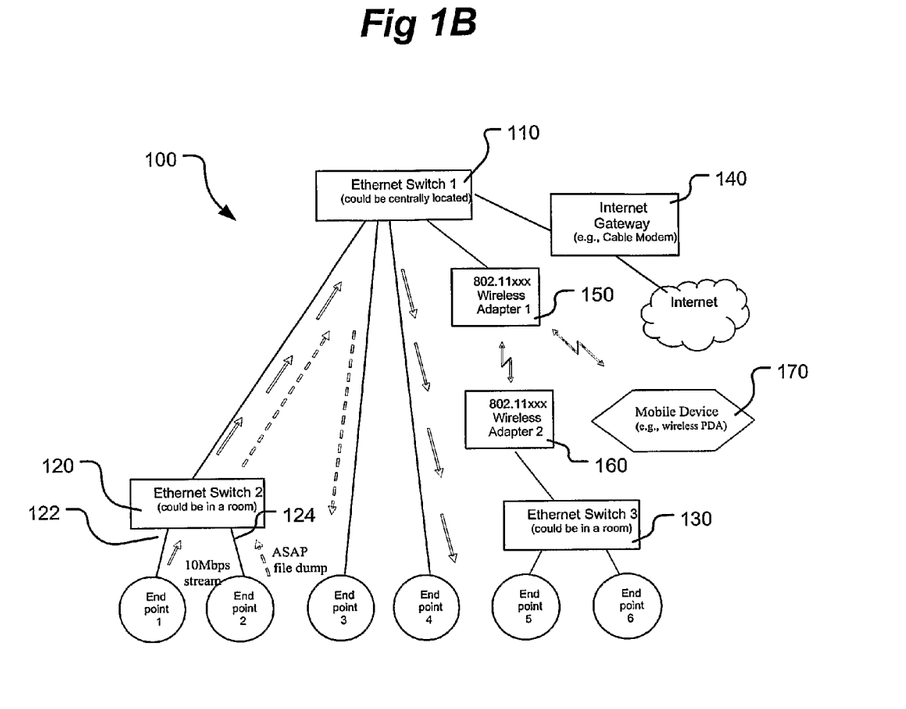

Referring now to FIG. 1B, there is shown a home network configuration 100 comprising source and destination endpoints in operable communication via one or more NIDs identified as elements 110, 120, 130, 150, and 160. In the exemplary embodiment depicted in FIG. 1B, NIDs 110, 120, 130 are implemented as switches while NIDs 150, 160 are shown as wireless adaptors. Gateway 140 provides internet connectivity via switch 110, while communication with mobile device 170 (e.g. a PDA or PC) is accomplished via one or more wireless network adaptors 150, 160 and endpoints 1, 2, 3, 4, 5 and 6. Packets are distributed from source to destination through the hierarchy of NIDs 110, 120, 130, 150, 160. For locations without wires, wireless LAN bridges may be used. Wireless access points may also be used to distribute packets to/from mobile devices or stations.

Referring still to FIG. 1B, in a given scenario a user may wish to stream video from Endpoint 1 (e.g. a PC) to Endpoint 4 (e.g. (DTV)) at a data rate of around 10 Mbps. The wired Ethernet links in FIG. 1B may take the form of 100 Mbps links. However, where a second user desires to transfer a relatively large data file (such as a media file or digital movie) from Endpoint 2 to Endpoint 3, problems may arise. Since that transfer is a simple file transfer, the common desire and implementation is that the file be transferred as fast as the network and participating processors permit. Accordingly, endpoint 2 may typically always have a packet available to send. As soon as its Ethernet link between switch 2 and endpoint 2 is available, the packet will be transferred. This will happen until the receive buffer in the switch is full or the file transfer is complete. If the buffer fills up, the switch may then perform some form of flow control, or simply drop the packet. Once the buffer in the switch has capacity for additional packets, packet transfer will resume. As shown in FIG. 1B, the link between Switch 1 and Switch 2 carries both sets of traffic. Where that link reaches its maximum capacity, both applications will experience some packet delay with jitter. Although the delay and jitter may not be critical to the file transfer application, it may have deleterious effects on the streaming application.

To mitigate deleterious effects on the streaming application, a BW limit of around 20 Mbps may be set on the ingress port of the Endpoint 1 link 122 of Switch 2 and a BW limit of 30 Mbps may be set on the ingress port of the Endpoint 2 link 124 of Switch 2 according to an aspect of the present invention.

Figure 2:
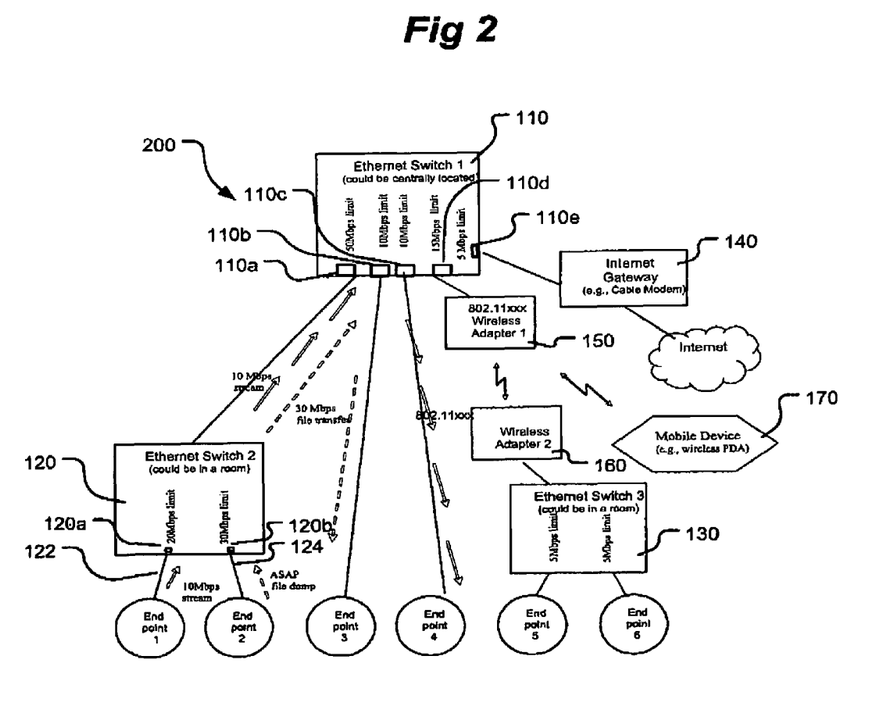
FIG. 2 illustrates an exemplary data transmission network architecture including bandwidth limiting functionality according to an aspect of the present invention.

Referring now to FIG. 2, there is shown a data transmission network configuration 200 according to an aspect of the present invention, and largely corresponding to the network layout of FIG. 1B. Like references have been used for like network elements. NID 110 (switch 1) has five ingress ports (110a, 110b, 110c, 110d, 110e) being bandwidth limited to 50 Mbps, 10 Mbps, 10 Mbps, 15 Mbps and 5 Mbps, respectively. NID 120 (switch 2) has 2 ingress ports (120a, 120b) being bandwidth limited to 20 Mbps and 30 Mbps, respectively. NID 130 (switch 3) has 2 ingress ports each being bandwidth limited to 5 Mbps, respectively. As will be understood by those possessing an ordinary skill in the pertinent arts, the artificial BW limit for Endpoint 1 should not affect the streaming application where the desired signal is 10 Mbps and the limit is 20 Mbps, for example. However, the 30 Mbps limit on the ingress port connected to Endpoint 2 will limit the previously discussed file transfer data traffic. In the network of FIG. 1B, such data is sent as fast as possible. However, in the band limited network of FIG. 2, the maximum data rate is limited to no more than 30 Mbps. This will limit the aggregate rate of the combined traffic between NIDS 120-110 (switch 2 and switch 1) to less than 50 Mbps. 50 Mbps is sufficiently below the link rate of a 100baseT link, such that it should have sufficient capacity to send all of the packets without adding intolerable delay and jitter to the packets associated with the streaming application data. Additional delay is added to the packets associated with the file transfer due to the BW limiting functions, but will not impact in most cases network users. In the event such delay imposed by specific BW limitations is intolerable for the network users, then the allowed maximum BW for the corresponding ingress port may be increased. If such increases cause the link between the switches to become overloaded, then one may compensate by reducing the BW on one of the other ports. In this manner, user-controlled data transfer enables a user to fine tune or adjust network data flow, through user control of switches, for example, according to the particular applications.

Figure 3:
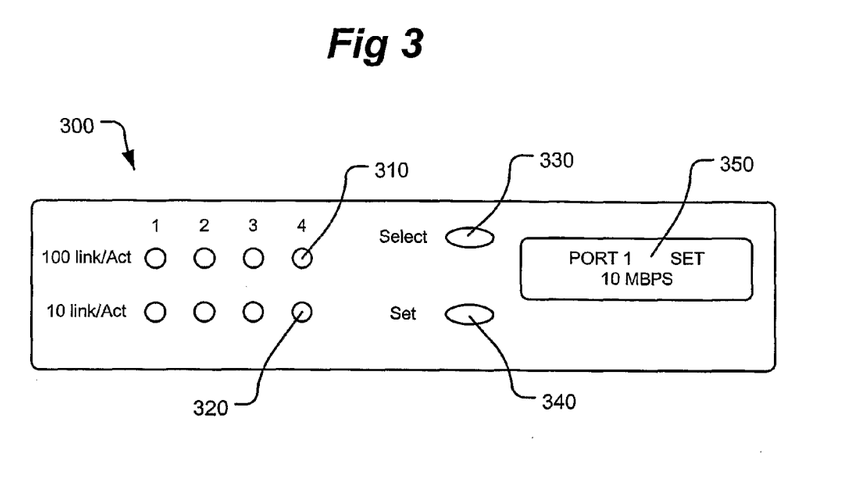
FIG. 3 illustrates a an exemplary user interface for a network infrastructure device according to an aspect of the present invention.

Referring now to FIG. 3, switch programmability may be facilitated through a user interface (UI 300) associated with an NID for performing network bandwidth control according to an aspect of the present invention. For example, the NID may include selectors for selecting ingress ports and bandwidth limit settings. Such selectors may include one or more user activatable switches that toggle through a selectable list of possibilities. FIG. 3 illustrates a user interface panel 300 well suited for use with a 4 port NID. The actual ports may take the form of conventional RJ-45 type connectors on a rear panel of the NID, for example. User interface panel 300 includes conventional 100 Mbps port activity/connection indicators 310 and 10 Mbps port activity/connection indicators 320. Panel 300 may also include display 350 that shows the current setting when the user is making an adjustment, and optionally displays the actual data rate entering that port during normal operation. Feedback on the actual rate may prove useful for alerting the user as to whether excess capacity (if any) on a particular ingress port. There could be one display for all ports (typically 4 or 8 on a switch designed for residential network applications) with a choice being made by the user at the beginning of the adjustment process using a port selection switch. Panel 300 also includes user input buttons 330, 340. Button 330 may be used to select which port to BW limit, as well as the value of the BW limit. The BW limit value may be selected from pre-populated lists, or based upon a step value, for example. Button 340 may be used to verify user selection of the port and/or BW limit value.

By way of further non-limiting example only, a user activating button 330 may cause display 350 to cycle between available ports (e.g., PORT 1, PORT 2, . . . ). Activating button 340 of the device may cause the port currently displayed to become the port to be bandwidth limited. Further activation of button 330 may cause the display to cycle through a pre-configured set of bandwidth limiting values (e.g., 5 Mbps, 10 Mbps, 15 Mbps, 20 Mbps, 30 Mbps . . . ). Upon further activation of button 340, the currently displayed bandwidth limit may be imposed upon the selected port. Of course, it is contemplated that other methods of interacting with buttons 330, 340 and display 350 may also be used.

A NID incorporating buttons 330, 340 and display 350 may include suitable resources for operating these elements and enforcing a selected artificial maximum bandwidth limit. For example, such a NID may include a processor and memory for implementing the BW limiting functionality. "Processor", as used herein, refers generally to a computing device including a Central Processing Unit (CPU), such as a microprocessor. A CPU generally includes an arithmetic logic unit (ALU), which performs arithmetic and logical operations, and a control unit, which extracts instructions (e.g., code) from memory and decodes and executes them, calling on the ALU when necessary. "Memory", as used herein, generally refers to one or more devices capable of storing data, such as in the form of chips, tapes or disks. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further non-limiting example only. The memory utilized by the processor may be internal or external to an integrated unit including the processor. For example, in the case of a microprocessor, the memory may be internal or external to the microprocessor itself. Of course, other elements may be used, such as an electronic interface or Application Specific Integrated Circuit (ASIC), for example.

Figure 4:
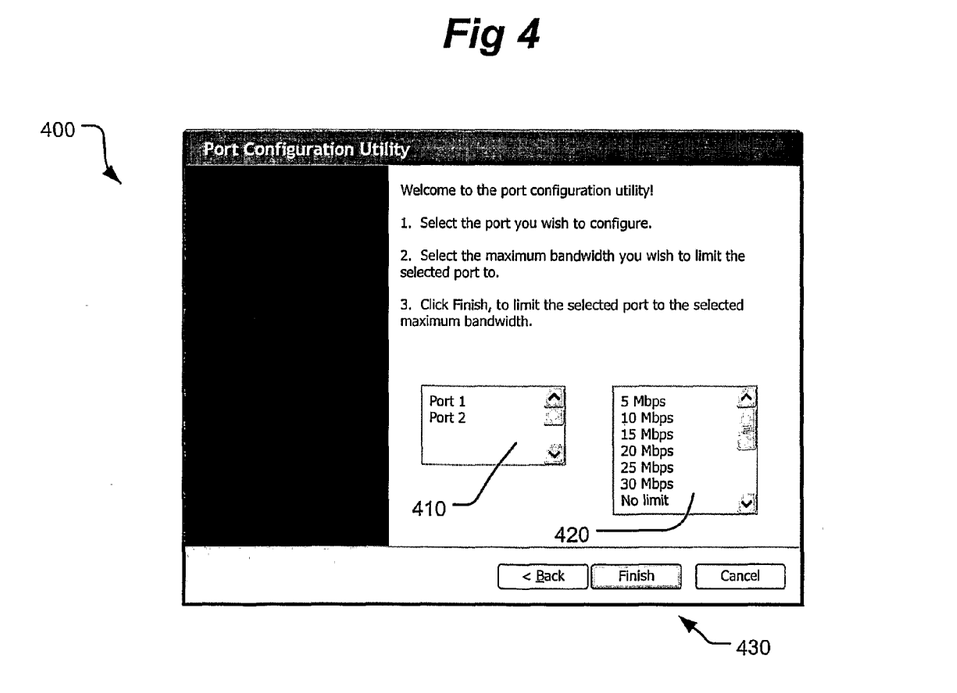
FIG. 4 illustrates an exemplary user interface for a network infrastructure device according to another aspect of the present invention.

Alternatively, user configuration or re-configuration may be facilitated using a web server integrated into the NID. Referring now to FIG. 4, there is shown an exemplary web page (e.g., including HTML encoded text) that may be generated by a BW limiting NID and provided to a configuring web browser. Web servers have been conventionally integrated into residential grade routers, wireless access points, and LAN modems to facilitate configuration. A similar strategy may be used to select and implement bandwidth limits according to an aspect of the present invention. However, the present invention also contemplates use and implementation of other types of user interfaces.

Figure 5:
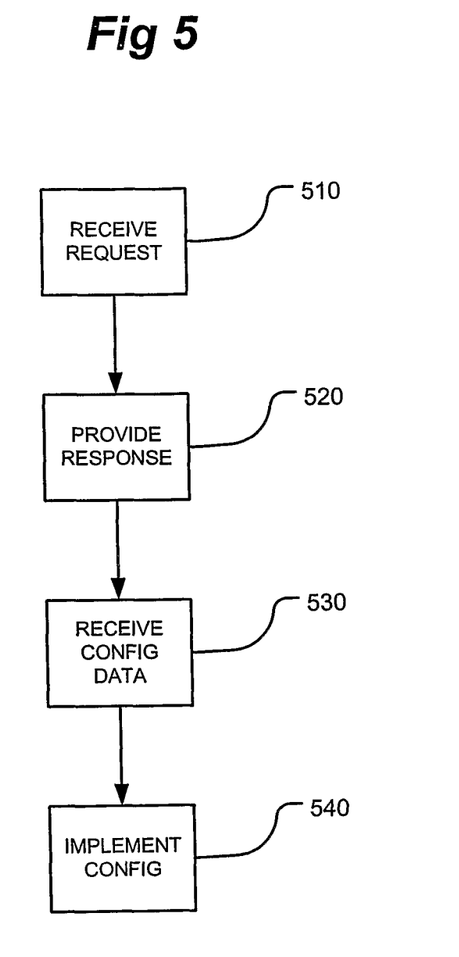
FIG. 5 illustrates a process according to an aspect of the present invention.

Referring now also to FIG. 5, there is shown a process 500 according to an aspect of the present invention. Process 500 may be particularly well suited for use with network configuration 200 of FIG. 2 and interface 400 of FIG. 4. Referring now to FIG. 5, in conjunction with FIGS. 2 and 4, a NID configuration web page 400 may be accessed by entering an IP address of the NID that a user desires to configure (e.g., http://192.168.1.xxx) in a web browsing software module (e.g., Internet Explorer) running on a suitable computing device operatively connected to the NID (e.g., a personal computer connected via a LAN).

By way of further, non-limiting example only, and in one configuration, web browsing software executed at endpoint 1 may be used to access an address associated with NID 120 (switch 2). The request may be received at NID 510. The request, or a subsequent communications exchange, may indicate that the requesting user wishes to impose an artificial bandwidth limit on an ingress port. In response, the NID may return 520 an HTML encoded web page 400 that allows the user to configure a port. The port configuration utility user interface 400 may take the form of a web page or window, such as that shown in FIG. 4. In the example illustrated in FIG. 4, interface 400 includes port selection window 410 which provides user selectable data items (e.g., entries in a list box) indicative of ingress ports on the NID. Window 410 shows two user selectable ports. Interface 400 further includes scrollable bandwidth window 420 for selecting among different bandwidth limits for each port. Window 400 also includes navigation devices 430, such as a back button, to allow a user to return to the previous web page, for example. A Finish button confirms user selections and a Cancel button aborts the configuration process. A user may interact with window 400 via a conventional pointing device such as a mouse.

Upon selection of a given port to configure and a corresponding artificial bandwidth limit associated with the selected port, the user may activate the Finish button of navigation device 430. Upon activation thereof, the NID receives 530 the new configuration data indicative of the particular user selection. This data may be passed to the NID using any conventional manner, such as part of a uniform resource locator (URL), for example. The NID may detect and capture this information using any suitable methodology. The NID then implements 540 the corresponding user selected limits.

According to an aspect of the present invention, the BW limiting function may be implemented using the Leaky Bucket Algorithm. This algorithm is described in "High Speed Networks", by William Stallings (copyright 1998). This may be analogous to methodology used to limit the data rate in cable and DSL modems, for example. The time constant for the Leaky Bucket may be chosen based on the type of traffic the NID will encounter, and may be based upon a NID advertised application, for example. By way of example only, a time constant in the 100 msec range may be suitable. As will be understood by those possessing an ordinary skill in the pertinent arts, this limitation on bit rate does not imply any change to the actual link rate, which for 100baseT is 100 Mbps, for example. In fact, it may be desirable to use the highest link rate available. This may prove particularly useful for wireless links.

By way of further example the Leaky Bucket Algorithm basically uses a small queue, with packets transferred out at a set rate. When the average input rate exceeds the average output rate the queue will eventually fill up. While the queue is full, additional packets cannot be accepted into the queue until the level of the queue drops sufficiently low to allow more packets. The queue may be responsive to the processor used to provide for user configuration of the NID. In this fashion, the NID may receive bits at a maximum bit rate corresponding to the user selection rather than the actual link rate.

As will also be understood by those possessing an ordinary skill in the pertinent arts, an endpoint that is sending data may require notification that a packet was dropped or not transmitted. Where the functionality of the NID is limited to layer 2 of the OSI Reference Model, there is no assumption that TCP is present. Instead, according to an aspect of the present invention, one may rely on Ethernet services available to effectively control the flow from the sourcing endpoint. When two Ethernet interfaces are connected via a cable, the physical interfaces negotiate the specific version of Ethernet that they will use for communication. Interface speed may range from 10 Mbps to 1 Gbps, by way of non-limiting example only. There are also other attributes such as flow control and full/half duplex. According to an aspect of the present invention, the mechanism used to provide feedback to the sender may depend on what services are available after that negotiation. In the case of a full duplex Ethernet link with flow control, the flow control mechanism can be used directly to inform the source-endpoint transmitter not to transmit any more packets when the incoming queue is full. When the queue has sufficiently emptied to enable acceptance of additional packets, the flow control mechanism allows further transmissions to take place.

In the case of a half-duplex link that does not support flow control, the switch can simulate or emulate that a MAC-level collision occurred during the "slot-time" of the incoming packet. According to the Ethernet standard, if a collision is detected during this interval, the transmitter will transmit a "collision enforcement jam signal" and then end the packet transmission. The transmitter then transitions into a "back-off" period, where it waits a random amount of time before attempting further transmission. This process continues until the packet gets through. All other packets will wait in the transmit queue of the transmitting endpoint until the instant packet is transferred. Other mechanisms for controlling flow into a "throttled" or "governed" ingress port of a NID including use of other levels of the OSI Reference Model may also be used.

Figure 6:
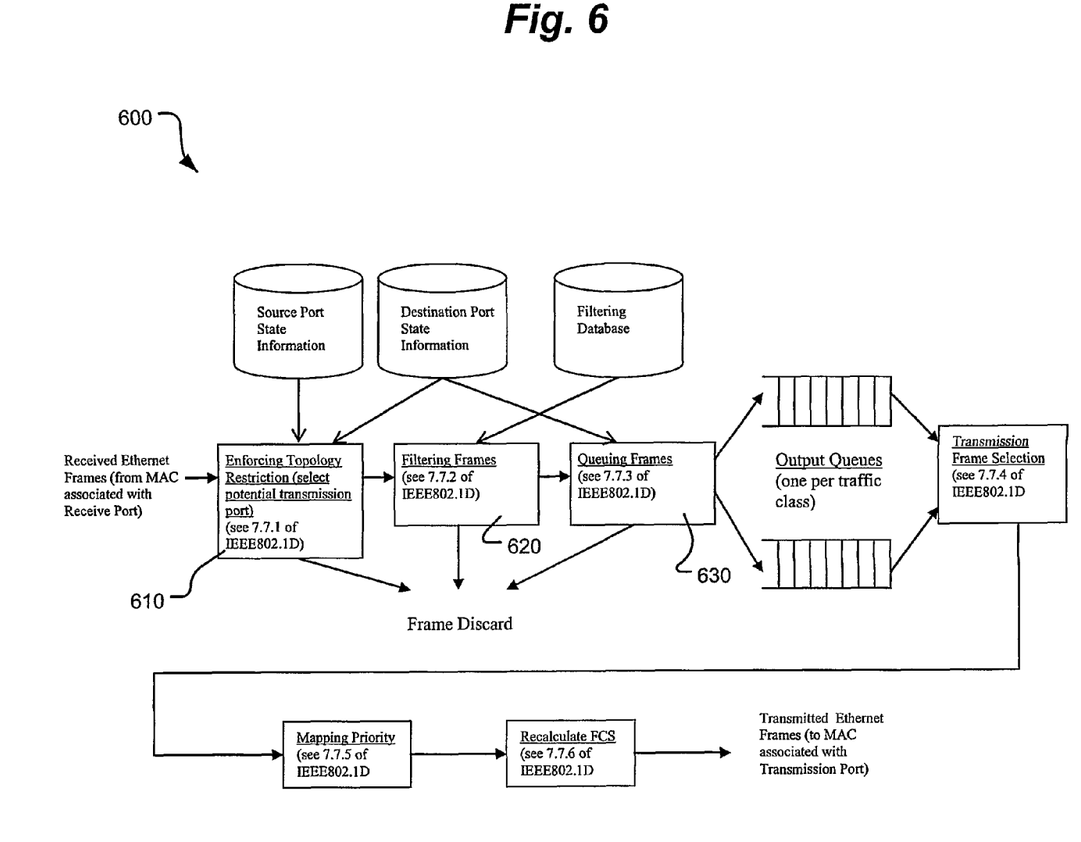
FIG. 6 illustrates operation of a forwarding process in an IEEE802.1D compliant manner.

Referring now to FIG. 6, there is shown an illustration of a bridge forwarding process 600 that is compliant with the IEEE802.1D standard. It is worth noting that Ethernet Switches and 802.11 Access Points may be viewed as specific implementations of an IEEE802.1 Bridge. The Receive function of the MAC associated with the receiving port and the transmit function of the MAC associated with the transmission port are not shown. Further, IEEE802.1D does not specify actual implementations but only specifies the functional process as a packet is forwarded from the MAC of one port to the MAC of another port.

For example, with respect to enforcement topology block 610, the IEEE802.1D specifies that each port is selected as a potential transmission port if, and only if: (a) the port on which the frame was received was in a forwarding state, and (b) the port considered for transmission is in a forwarding state, and (c) the port considered for transmission is not the same as the port on which the frame was received, and (d) the size of the mac_service_data_unit conveyed by the frame does not exceed the maximum size of mac_service_data_unit supported by the LAN to which the Port considered for transmission is attached. For each port not selected as a potential transmission port, the frame shall be discarded. With respect to filtering frames block 620, IEEE802.1D specifies that filtering decisions are taken by the Forwarding Process on the basis of: (a) the destination MAC address carried in a received frame; (b) the information contained in the filtering database for that MAC Address and reception port; and (c) the default group filtering behavior for the potential transmission port. Finally, with respect to queuing frames block 630, IEEE802.1D specifies that the forwarding process provide storage for queued frames, awaiting an opportunity to submit these for transmission to the individual MAC Entities associated with each bridge port. The order of frames received on the same bridge port shall be preserved for: (a) unicast frames with a given user_priority for a given combination of destination_address and source_address; and (b) multicast frames with a given user_priority for a given destination_address. The forwarding process may provide more than one transmission queue for a given bridge port. Frames are assigned to storage queue(s) on the basis of their user_priority using a traffic class table that is part of the state information associated with each port. The table indicates, for each possible value of user_priority, the corresponding value of traffic class that shall be assigned. Values of user_priority range from 0 through 7. The output queues and the processes that follow those queues are associated with the transmission port.

Figure 7:
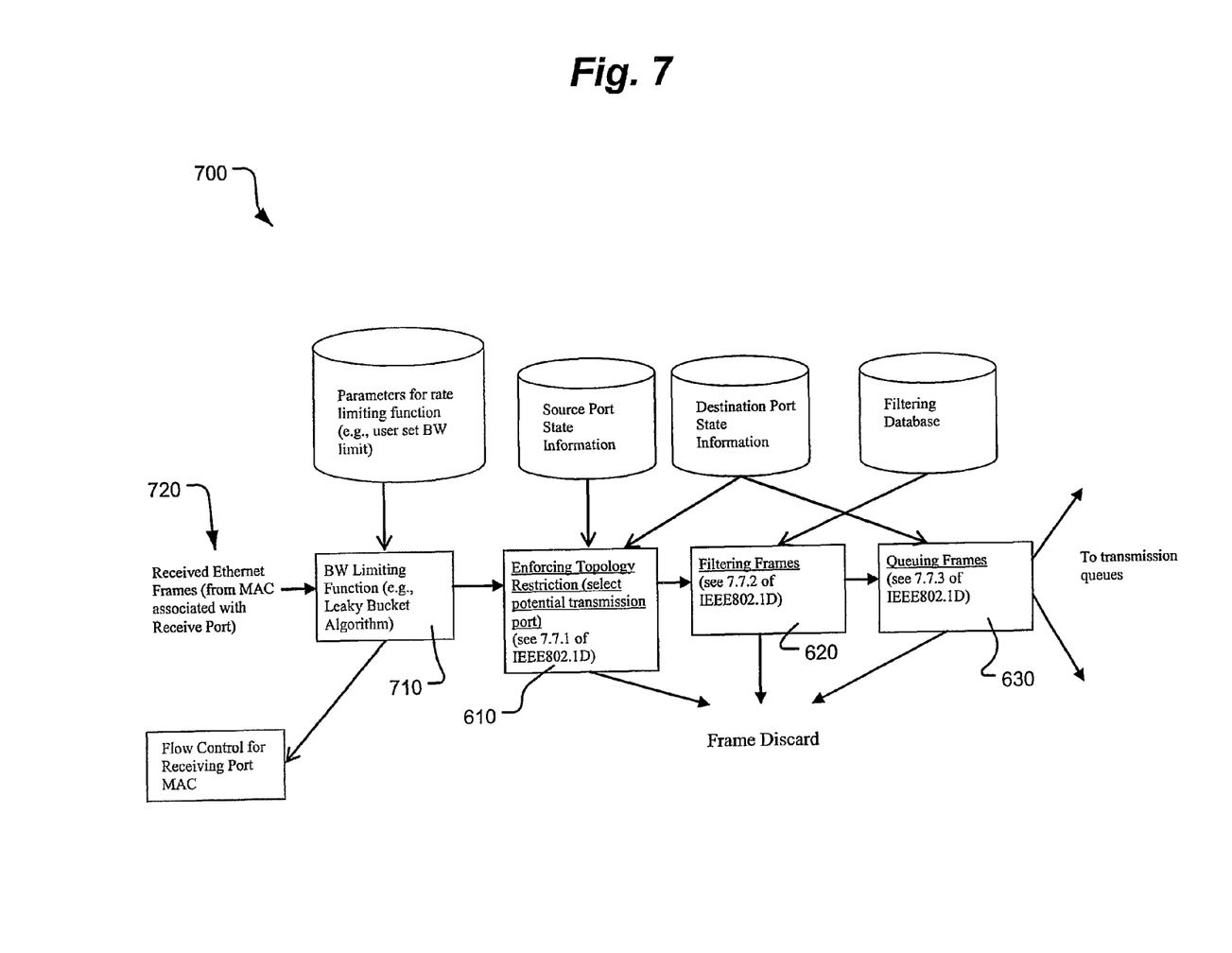
FIG. 7 illustrates operation of a forwarding device according to an aspect of the present invention and in an IEEE802.1D compliant manner.
Figure 8:
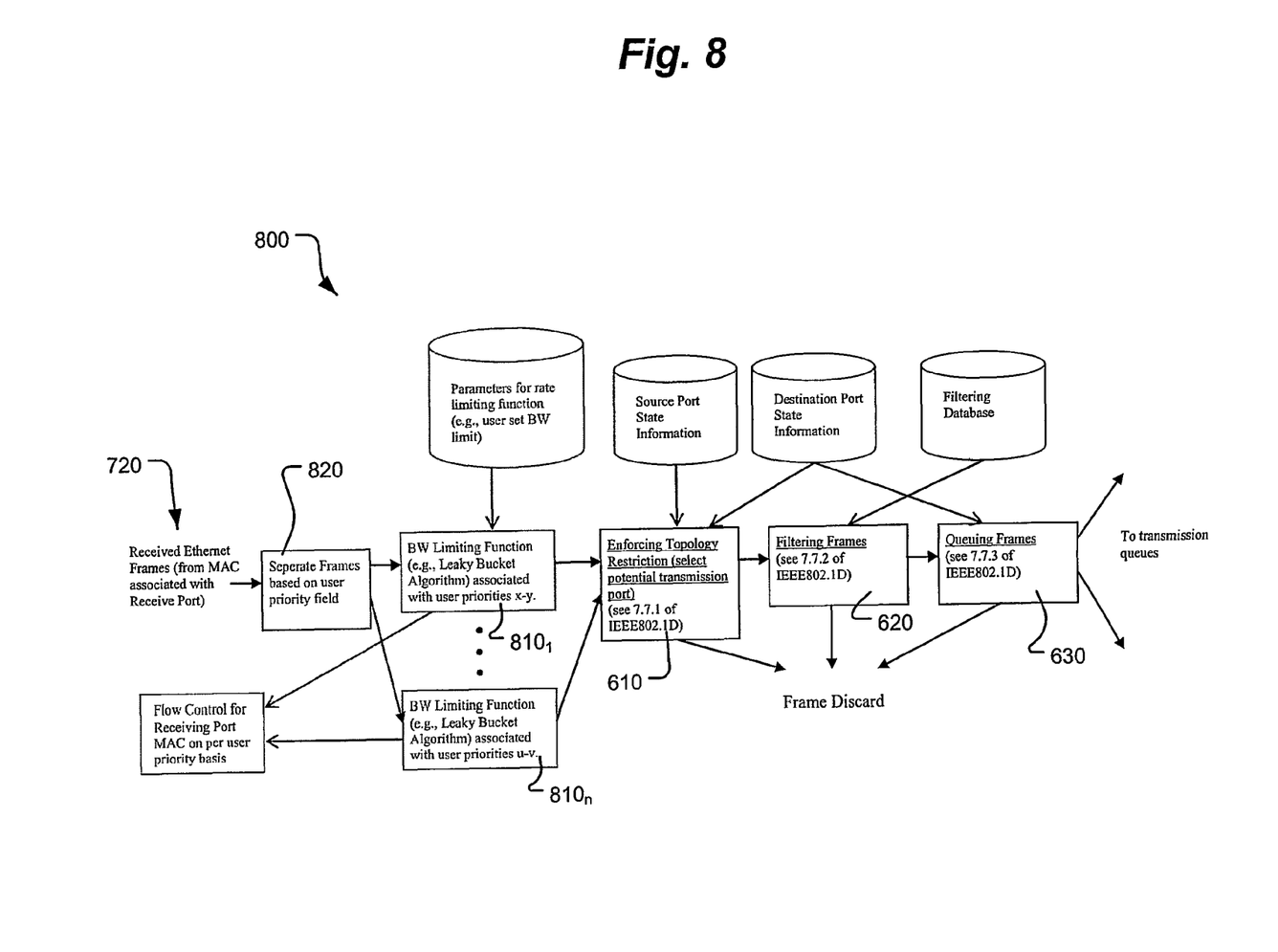
FIG. 8 illustrates operation of a forwarding device according to an aspect of the present invention and in an IEEE802.1D compliant manner; and, FIG. 9 illustrates another exemplary data transmission network architecture according to an aspect of the present invention.

Processes 610-630 may be implemented on a per port basis or as a single flow. If implemented on a per port basis, one may implement BW limiting function within that chain. FIG. 7 illustrates a configuration 700 implementing the BW limiting function 710 between the Receiving Port MAC 720 and the forwarding processes 610-630.

Where the NID supports 802.1p/q priorities through the use of multiple output queues per transmission port, it may prove desirable to limit the traffic on a per user-priority basis. In that case, a separate Leaky Bucket Algorithm associated with each group of user priorities per Receive Port may be used (note that 802.1D allows user priorities to be grouped, thereby allowing less than 8 user priorities). As shown in FIG. 8, the frames may be divided 820 into separate groups based on user priorities before entering the appropriate Leaky Bucket Algorithm $810_1$-$810_n$. Each group of packets may be rate controlled separately. If the input queue associated with that Leaky Bucket Algorithm is full, then flow control may be exercised on packets with that user priority marking entering the corresponding Receive Port.

In certain situations, the aforementioned method may not guarantee delivery of a data stream having good QoS. For example, with respect to FIG. 2, the user at endpoint 4 may be watching a 10 Mbps video stream. However, where a user at endpoint 3 requests a file from endpoint 1 (PC) instead of from endpoint 2, a QoS problem may present itself. In this case, if endpoint 1 does not give higher priority to the video stream packets, then the QoS of that video stream suffers. According to an aspect of the present invention, the risk of failure in such a scenario may be at least partially mitigated by implementing a process to identify streams separately by looking at upper layers (e.g., IP address and port address) and then exercising separate flow control based upon that information.

Further, in the case of a NID that supports IEEE802.1q priorities, one may assign a BW limit on a per priority basis, for example. A NID that includes this additional functionality may incorporate a more complicated user interface. In that case, a web browser that interacts with the switch may be particularly well suited. The BW limit may also be associated with all of the traffic coming in an ingress port, regardless of the priority marking on the packet. The higher priority packets may still get preferential treatment as described in IEEE802.1D once past the BW limit function, but all of the traffic coming into that port would be subject to the limitation.

The same techniques described for Ethernet Switches can be applied to components of an 802.11xx compliant wireless network, for example. In most cases, a wireless component can be considered to be part of an 802.1D bridge, similar to an Ethernet Switch. The difference is that the bridge is distributed instead of being contained in one box and the wireless link itself represents a single collision domain. For Ethernet switches, it is often desirable that the link continue to operate at maximum speed (e.g., 100 Mbps for 100baseT). This may be more important for wireless links, since in many cases if one link is slowed down to a lower rate then all of the links slow down to that same low rate.

For example, assuming that a wireless link rate is 54 Mbps (which is readily achievable for 802.11a or 802.11g over a short distance), the actual measured throughput for such a link after overhead has been taken into account may be around 30 Mbps. This 30 Mbps must be shared by the nodes on the wireless portion of the network. For a wireless access point with an Ethernet interface, the approach is analogous to that presented for a switch implementation of a NID. Flow control may be accomplished in the same way and the placement of the Leaky Bucket Algorithm would be analogous. BW limiting in the wireless segment of a data transmission network is further discussed with regard to FIG. 9.

Figure 9:
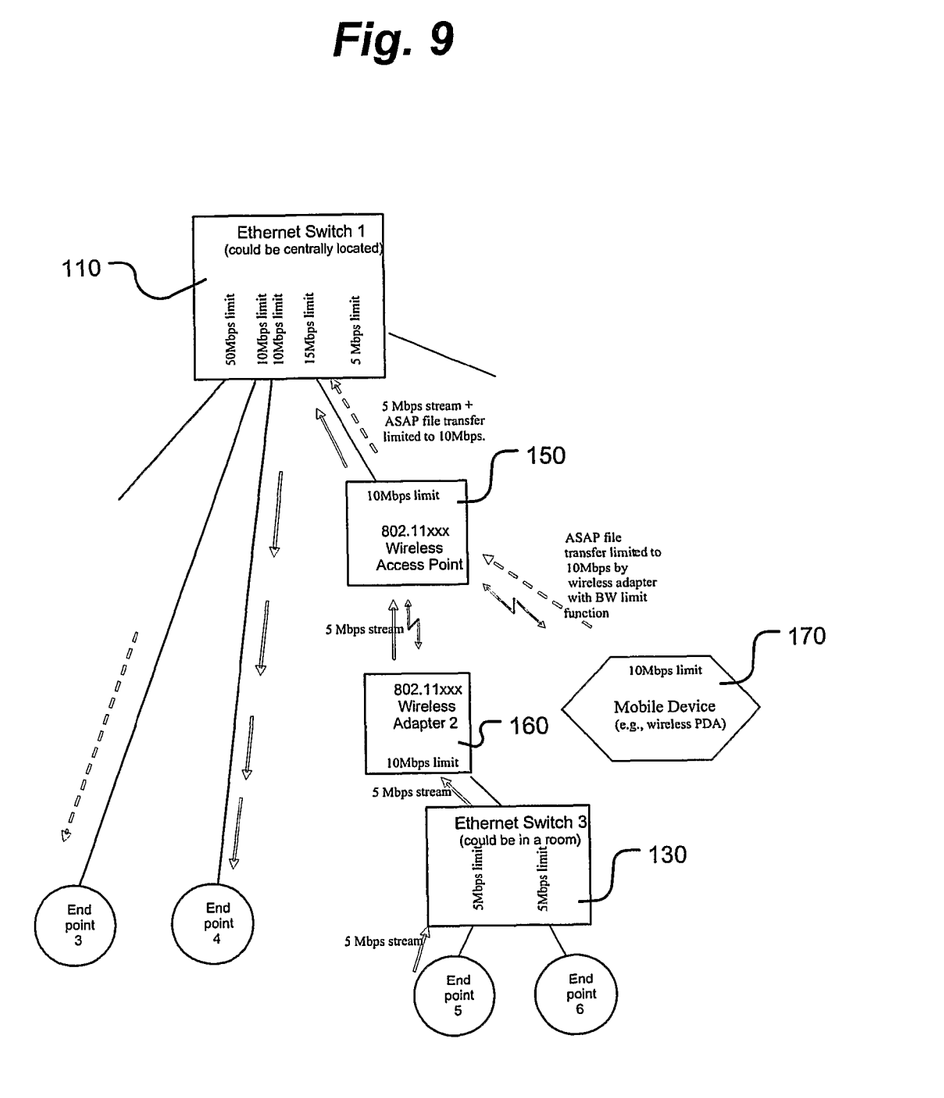

FIG. 9 illustrates a more detailed view of a portion of data transmission network 200 (FIG. 2) according to an aspect of the present invention. For wireless adapter cards that install directly into a PC, no Ethernet interface exists. The interface to the card is typically a PC bus interface such as PCMCIA. In this case, the PC's processor loads a buffer with the data and sets a flag that indicates to the card that a frame of data is ready to be transmitted. After the frame is transmitted, the card sets a flag indicating to the processor that the frame has been transmitted and that the buffer is ready to accept another frame of data. If the host processor is sending frames at a rate faster than the maximum allowed, then the wireless adapter card may delay in setting the flag (e.g. one or more bits) that indicates the buffer is ready to accept more frames.

The same methods described for an Ethernet NID can be used to adjust the BW limit on a wireless Access Point. Use of a web server, (since most wireless APs are configured via a built-in web server), may prove particularly advantageous for implementing the BW limiting functionality. For wireless adapter cards, the adjustment may be performed as an option to the device driver on the PC, however other configuration utilities may also be utilized.

Various strategies can be used for setting defaults and/or overall BW limits. Defaults may be chosen such that users can install bandwidth limiting NIDs without concern for changing settings. In some cases, defaults for NIDS may depend on how many ports are on the switch. In other cases, the defaults may depend on the intended application (e.g., High Definition Streaming). That is, NIDs may be advertised as being preconfigured for given network topologies or applications. One possible strategy would be to set the defaults such that if two or three data flows are aggregated on a single transmission port, the total BW of those data flows remains below the link rate of the applicable transmission port. For example, if each ingress port were limited to 25 Mbps, then three flows aggregated onto a single transmission port would consist of a BW limited to 75 Mbps or less. If the link is a full duplex 100baseT link, then all three flows will get transmitted with reasonable QoS and negligible blocking.

A more conservative strategy sets the default limit for each ingress port such that the total BW of all ingress ports is below the link rate of the slowest transmission port. For example, for a 9-port 100baseT switch, it may be desirable to set the default BW limit for each ingress port to 12 Mbps. It may also be useful to have a maximum BW limit associated with each ingress port or total BW limit associated with the switch to limit the choices of the user. The per port limit logic flow would be similar to that for setting the default. For example, if it is assumed that traffic from two ingress ports may be aggregated onto a single transmission port, then the BW for the ingress port could be limited to one half the maximum throughput of that transmission port (e.g., close to 50 Mbps for a 100 Mbps). Alternatively, the maximum limit per port could be a percentage of some overall maximum. The overall maximum may be a constant or may be function of the number of ports. This overall limit may also be programmable.

It is recognized that in certain cases a user may not be interested in manually adjusting NID bandwidth limits. Accordingly, the present invention also contemplates an adaptive BW limiting function. Adaptive BW limiting may operate by characterizing traffic entering an ingress port as streaming traffic or ASAP traffic. The default limit may be set to a number sufficiently large to allow stream flow (e.g., at 30 Mbps). If a stream is detected on one of the ports, then the BW of the other ingress ports on that switch can be reduced. In this way, aggregated traffic on an egress port stays below the link rate such that QoS for the stream is assured. In an exemplary embodiment, adaptive bandwidth limiting may occur when a NID detects streaming data ingressing on one of its ports and limits the other ports available bandwidth accordingly. For example, an application running on an endpoint or a streaming data server may transmit a message that traverses the NID, such as in a URL or in a data transport header. The NID may audit messages traversing it, to detect this message. Upon detecting this message, other ports on the NID may be automatically bandwidth limited until the data stream ceases or a cease streaming message, analogous to the detected commence streaming message is received by the NID. Alternatively, the NID may monitor data traffic patterns to identify a pattern indicative of streaming data, such as at least a given number of packets coming from a given source and headed for a given destination in a given temporal period. Such a NID may examine data transport header information to identify source and destination addresses and timestamps indicative of a data stream, for example. Of course, other techniques for automatically detecting streaming data, and adaptively bandwidth limiting other ports responsively thereto may also be used.

It is recognized that this scheme may not "optimize" the use of the network's total BW. However, complete BW optimization is unnecessary on many networks, including most residential networks, given the relative affordability of Gigabit Ethernet devices and cabling. It is believed to be desirable to provide a simple and efficient way to assure high QoS for streaming applications. In many telecommunication networks, the network is "over-provisioned", meaning it is possible that more traffic can be generated than the network can handle. That can result in network "blocking." According to an aspect of the present invention, the network may actually be forced into an "under-provisioned" condition whereby the network can actually handle more traffic than will be allowed. In some configurations, the links on which traffic gets aggregated are adapted to support Gigabit Ethernet (e.g., the links running to NID 110, FIG. 2). Further, as will be understood by those possessing an ordinary skill in the pertinent arts, the present invention can be applied to any CSMA-CD packet LAN that uses a similar physical architecture.

It will be apparent to those skilled in the art that various modifications and variations may be made in the apparatus and process of the present invention without departing from the spirit or scope of the invention. Thus, it is intended that the present invention cover the modification and variations of this invention provided they come within the scope of the appended claims and their equivalents.

What is claimed is:

1. An apparatus comprising:
    a plurality of ingress ports coupled to a data network and for accepting packetized data from the data network;
    a user interface for enabling user inputs to the apparatus; and
    a controller coupled to the user interface for receiving a request from a user, and in response to the request, transmitting rate limiting function parameters to the user interface for enabling the user to select a bandwidth limit between at least one of the ingress ports and the data network and for dividing data frames into a plurality of groups based on user priorities, the controller limiting a rate at which data transmitted by the data network to the apparatus is accepted by said at least one of the ingress ports in response to the user selection of the bandwidth limit, the controller also configured to enable an adaptive bandwidth limiting function, wherein the controller detects the presence of streaming data on an ingress port, and in response, increases the bandwidth associated with the ingress port associated with the streaming data and decreases the bandwidth associated with remaining ones of said plurality of ingress ports to thereby ensure that aggregate bandwidth for an associated egress port remains below a set QOS limit.

2. The apparatus of claim 1, wherein said user interface comprises HTML encoded text.

3. The apparatus of claim 1, wherein said user interface comprises a web page.

4. The apparatus of claim 1, wherein said user interface comprises at least one of a user operable switch and a button.

5. The apparatus of claim 1, wherein said apparatus is selected from a group consisting of: an Ethernet switch, an Ethernet router, and an Ethernet Hub.

6. The apparatus of claim 5, further comprising a buffer of a particular size and wherein the rate at which data is accepted into the at least one of the ingress ports is implemented using a leaky bucket application.

7. The apparatus of claim 1, wherein said apparatus is selected from a group consisting of: a wireless access point, a wireless adaptor and a wireless bridge.

8. The apparatus of claim 7, further comprising a buffer of a particular size and wherein the rate at which data is accepted into the at least one of the ingress ports is implemented using a leaky bucket application.

9. A user interface comprising:
    a first user interactive device for enabling a user to select one of a plurality of ingress ports of a switching device suitable for being coupled to and accepting data from a data transfer network; and,
    a second user interactive device for enabling the user to limit a rate at which data is accepted on said selected ingress port; and
    wherein said switching device receives a request from the user and, in response to the request, transmits rate limiting function parameters for enabling the user to select said selected ingress port via said first user interactive device, selects said rate at which data is accepted on said selected ingress port via said second user interactive device, and divides data frames into a plurality of groups based on user priorities, said switching device also adapted to enable an adaptive bandwidth limiting function, wherein the switching device detects the presence of streaming data on an ingress port, and in response, increases the bandwidth associated with the ingress port associated with the streaming data and decreases the bandwidth associated with remaining ones of said plurality of ingress ports to thereby ensure that aggregate bandwidth for an associated egress port remains below a set QOS limit.

10. The user interface of claim 9, wherein said first and second devices comprises at least one of a user operable switch and a button.

11. The user interface of claim 9, wherein said first and second devices each comprise user interactive data items.

12. The user interface of claim 11, wherein said user interactive data items include entries in list boxes.

13. A method of operating a data transfer network for providing improved streaming application processing comprising:
    enabling user selection of one of manual bandwidth limiting function and an adaptive bandwidth limiting function;
    if the manual bandwidth limiting function is selected:
    receiving a request from a user to bandwidth limit on said data transfer network at an intra-domain network switching device;
    transmitting from said intra-domain network switching device rate limiting function parameters for enabling a user to select at least one of a plurality of ingress ports to bandwidth limit;
    receiving data indicative of user selection of said rate limiting function parameters at said intra-domain network switching device;
    dividing data frames into a plurality of groups based on user priorities; and, bandwidth limiting at least one of said ingress ports at said intra-domain network switching device according to said received data;
    if the adaptive bandwidth limiting function is selected:
    detecting the presence of streaming data on an ingress port, and in response, increasing the bandwidth associated with the ingress port associated with the streaming data and decreasing the bandwidth associated with remaining ones of the plurality of ingress ports to thereby ensure that aggregate bandwidth for an associated egress port remains below a set QOS limit.

14. The method of claim 13, wherein said bandwidth limiting comprises setting a value corresponding to a queue size.

15. The method of claim 14, wherein said value corresponds to a time-constant.

16. The method of claim 13, further comprising adaptively limiting the bandwidth on other ingress ports of said device according to packet data received on another one of said ingress ports of said device.

17. The method of claim 16, further comprising determining if said packet data on said another one of said ingress ports is streaming data and bandwidth limiting said other ingress ports in response to said determination.

18. An apparatus comprising:
    at least first and second ingress ports for accepting data from a data transfer network; and
    means for enabling a user to select one of a manual bandwidth limiting function and an adaptive bandwidth limiting function, wherein in the manual bandwidth limiting function the user is able to request and limit a rate at which data is accepted on at least said second ingress port and for transmitting rate limiting function parameters such that the data transfer rate between the at least said second ingress port and a device coupled to the at least said second port is limited, and for dividing data frames into a plurality of groups based on user priorities, whereby the potential of delay of data traversing the data transmission network via said first ingress port is reduced, and in the adaptive bandwidth limiting function the apparatus detects the presence of streaming data on an ingress port, and in response, increases the bandwidth associated with the ingress port associated with the streaming data and decreases the bandwidth associated with remaining ones of the plurality of ingress ports to thereby ensure that aggregate bandwidth for an associated egress port remains below a set QOS limit.

19. The apparatus of claim 18, further comprising:
means for adaptively limiting the data transfer rate between the at least said second ingress port and said device coupled to the at least said second port according to packet data received on one of said at least first and second ports.

20. The apparatus of claim 18, wherein said means for enabling a user to limit a rate at which data is accepted on at least said second ingress port comprises a user interface having user interactive data items for enabling port and data transfer rate selections.

\* \* \* \* \*